(12) United States Patent
Tappin

(10) Patent No.: US 11,687,797 B2
(45) Date of Patent: Jun. 27, 2023

(54) REAL-TIME PREDICTIVE KNOWLEDGE PATTERN MACHINE

(71) Applicant: Birdview Films, LLC, Malibu, CA (US)

(72) Inventor: Isabella Tappin, Malibu, CA (US)

(73) Assignee: Birdview Films, LLC, Malibu, CA (US)

( * ) Notice: Subject to any disclaimer, the term of this patent is extended or adjusted under 35 U.S.C. 154(b) by 202 days.

(21) Appl. No.: 17/159,707

(22) Filed: Jan. 27, 2021

(65) Prior Publication Data

US 2022/0138593 A1 May 5, 2022

Related U.S. Application Data

(63) Continuation of application No. 17/090,625, filed on Nov. 5, 2020, now Pat. No. 10,943,172.

(51) Int. Cl.
| | |
|---|---|
| *G06N 5/022* | (2023.01) |
| *G06F 16/248* | (2019.01) |
| *G06F 3/0482* | (2013.01) |
| *G06F 40/30* | (2020.01) |
| *G06F 16/2453* | (2019.01) |

(52) U.S. Cl.
CPC ........... *G06N 5/022* (2013.01); *G06F 3/0482* (2013.01); *G06F 16/248* (2019.01); *G06F 16/24534* (2019.01); *G06F 40/30* (2020.01)

(58) Field of Classification Search
CPC ........ G06N 5/022; G06N 20/00; G06F 40/30; G06F 40/205; G06F 16/248; G06F 16/243; G06F 16/24534; G06F 3/0482
See application file for complete search history.

(56) References Cited

U.S. PATENT DOCUMENTS

| | | | | |
|---|---|---|---|---|
| 8,548,231 B2 * | 10/2013 | Shet | ...................... | G06K 9/626 |
| | | | | 706/56 |
| 9,734,447 B1 * | 8/2017 | Diev | ...................... | G06N 5/045 |
| 11,188,831 B2 * | 11/2021 | Snyder | .................... | G06N 3/04 |

(Continued)

*Primary Examiner* — Etienne P Leroux
(74) *Attorney, Agent, or Firm* — Crowell & Moring LLP

(57) ABSTRACT

The disclosure below describes a knowledge pattern machine that goes beyond and is distinct from a traditional search engine as simple information aggregator. Rather than acting as a search engine of the data itself, the knowledge pattern machine use variously layers of artificial intelligence to discover correlations within the queries and historical data, and to derive and recognize data patterns based on user queries for predictively generating new knowledge items or reports that are of interest to the user. Previous patterns and knowledge items or reports are accumulated and incorporated in identification of new data patterns and new predictive knowledge items or reports in response to future user queries, thus providing a stateful machine. The predictive knowledge items are updated in real-time without user interference as the underlying data sources evolve overtime. The data patterns and knowledge items are organized hierarchically and may be shared among different users at various levels. This disclosure thus provides a pattern recognition machine with predictive analytics for enabling users to conduct research and to obtain and share unique real-time predictive data report based on intelligently processing user input queries.

16 Claims, 7 Drawing Sheets

(56) References Cited

U.S. PATENT DOCUMENTS

| | | | | |
|---|---|---|---|---|
| 2007/0288414 | A1* | 12/2007 | Barajas | G06N 20/00 706/46 |
| 2012/0117144 | A1* | 5/2012 | Douillet | H04L 67/141 709/203 |
| 2015/0317588 | A1* | 11/2015 | D'Amelia | G06Q 10/06315 705/7.25 |
| 2016/0065534 | A1* | 3/2016 | Liu | G06F 16/287 707/728 |
| 2017/0097744 | A1* | 4/2017 | Forstall | G06F 8/61 |
| 2017/0286388 | A1* | 10/2017 | Tamilarasan | G06F 3/0482 |
| 2018/0046829 | A1* | 2/2018 | Carasso | G06F 3/0484 |
| 2019/0095785 | A1* | 3/2019 | Sarkar | G06N 3/0472 |
| 2019/0362297 | A1* | 11/2019 | Farley | G06N 20/00 |
| 2020/0042515 | A1* | 2/2020 | Vora | G06F 16/22 |
| 2020/0134477 | A1* | 4/2020 | Lee | G06V 10/7788 |
| 2021/0041397 | A1* | 2/2021 | Hall | G01N 29/04 |
| 2021/0256420 | A1* | 8/2021 | Elisha | G06N 5/04 |

* cited by examiner

REAL-TIME PREDICTIVE KNOWLEDGE PATTERN MACHINE

CROSS REFERENCE

This application is a continuation of and claims priority to U.S. patent application Ser. No. 17/090,625, filed on Nov. 5, 2020, the entirety of which is herein incorporated by reference.

TECHNICAL FIELD

This disclosure relates to data analytics in a real-time predictive knowledge pattern machine.

BACKGROUND

To answer predictive question, a researcher following a scientific method must proceed through numerous manual steps and experimentation before arriving to a conclusion with communicable results, from which analysis is then manually developed to obtain predictive insights.

BRIEF DESCRIPTION OF THE DRAWINGS

For a more complete understanding of this disclosure, reference is made to the following description and accompanying drawings.

DETAILED DESCRIPTION

The following description and drawing set forth certain illustrative implementations of this disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

A traditional search engine serves as a simple data aggregator. In other words, the function of a traditional search engine is limited to search data sources for information items matching a set of keywords in various degrees. The search result is usually presented as a list of browsable data items that faithfully duplicate the information contained in their sources. Some sophisticated search engines may maintain up-to-date indexes of information items in the data sources to speed up searches. Nevertheless, such traditional search engine may not be capable of recognizing knowledge patterns in user queries and performing intelligent and predictive data analytics. Furthermore, while such a search engine may keep track of a search history for a particular user, it may not be configured to intelligently consider prior searches in performing a new search. In other words, new searches may not utilize knowledge gained in prior searches, i.e., a traditional search engine may be stateless.

The disclosure below describes a knowledge pattern machine that goes beyond a traditional search engine as simple information aggregator. Rather than acting as a search engine of the data itself, the knowledge pattern machine discovers correlations within the queries and historical data, derives data patterns based on user queries for predictively generating new knowledge items that are of interest to the user. Previous patterns and knowledge items are accumulated and incorporated in identification of new data patterns and new predictive knowledge items in response to future user queries, thus providing a stateful machine. The data patterns and knowledge items are organized hierarchically and may be shared among different users at various levels.

As described in more detail below, the knowledge pattern machine integrates various levels of artificial intelligence to provide predictive data analytics that significantly reduce the amount of manual user research with respect to queries that do not correspond to a direct answer from the available data sources. The pattern machine intelligently and automatically conducts predictive data analytics to generate qualitative and or quantitative answers and trends based on user queries.

Figure 1:
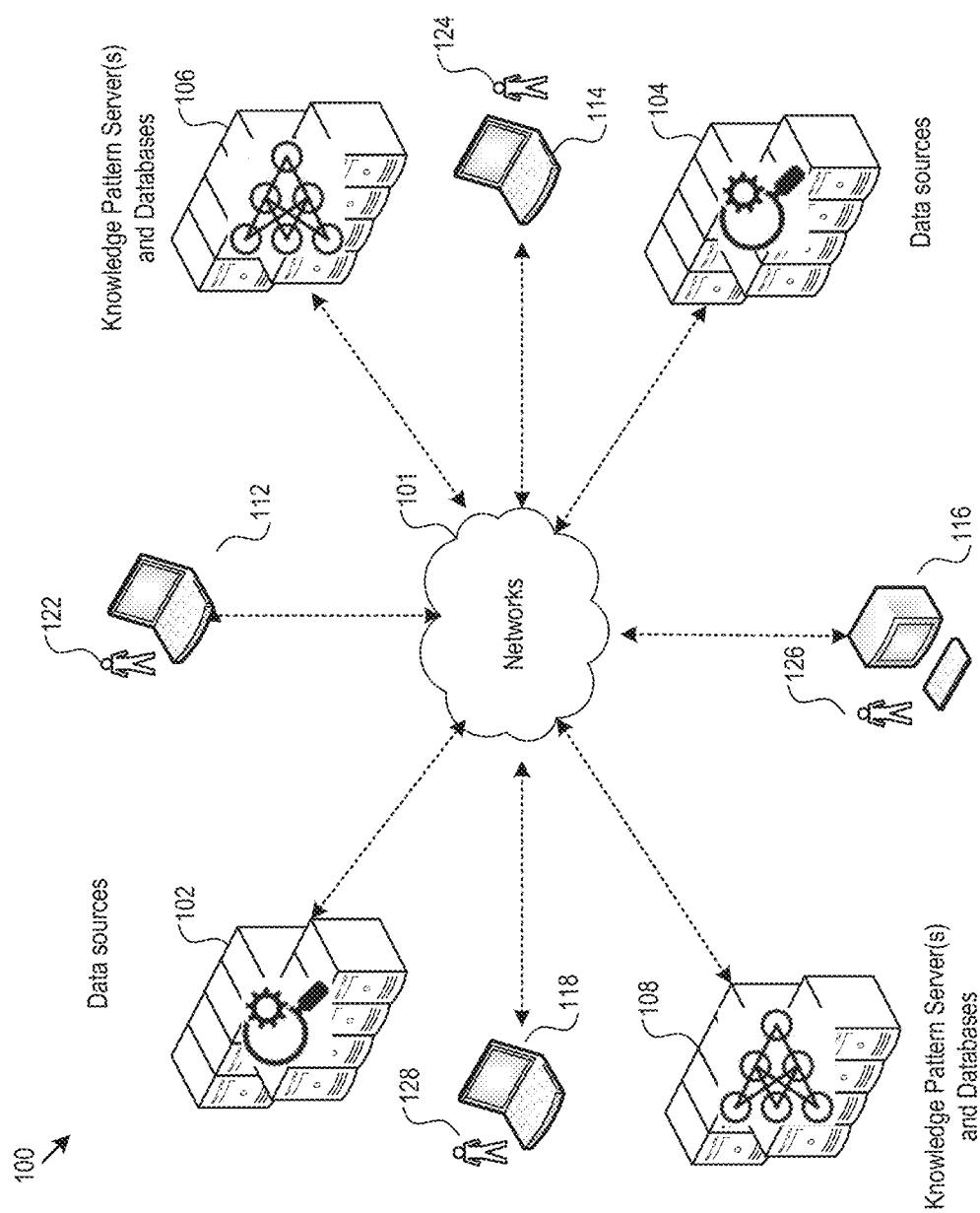
FIG. 1 illustrates an example computer network platform for implementing a real-time predictive knowledge pattern machine.

FIG. 1 shows an example network system 100 for implementing a knowledge pattern machine. System 100 includes one or more knowledge pattern servers and databases 106 and 108, and data sources 102 and 104. The knowledge pattern servers and databases 106 and 106 may be accessed by individual or a group of users 122, 124, 126, and 126 via their computing devices 112, 114, 116, and 118. The computing devices 112-118, knowledge pattern servers and databases 106 and 108 and data sources 102 and 104 may be connected via public or private communication networks 101. The knowledge pattern servers and databases 106 and 108 and data sources 102 and 104 may be centralized or may alternatively be distributed across various geographic regions. The knowledge pattern servers and databases 106 and 108 and data sources 102 and 104 may be implemented as dedicated computers. Alternatively, the knowledge pattern servers and databases 106 and 108 and data sources 102 and 104 may be implemented as virtual machines in, for example, a cloud computing environment. The computing devices 112-118 may be implemented as any electronic devices capable of accessing the knowledge pattern servers and databases 106 and 108 and data sources 102 and 104 via the communication network 101. The access may be provided by means of webpages accessible in web browsers running on the computing devices 112-118 or may be provided alternatively via dedicated client application programs running on the computing devices 112-118. Such access may be associated with a user account and may be permissioned via user password protection.

Figure 2:
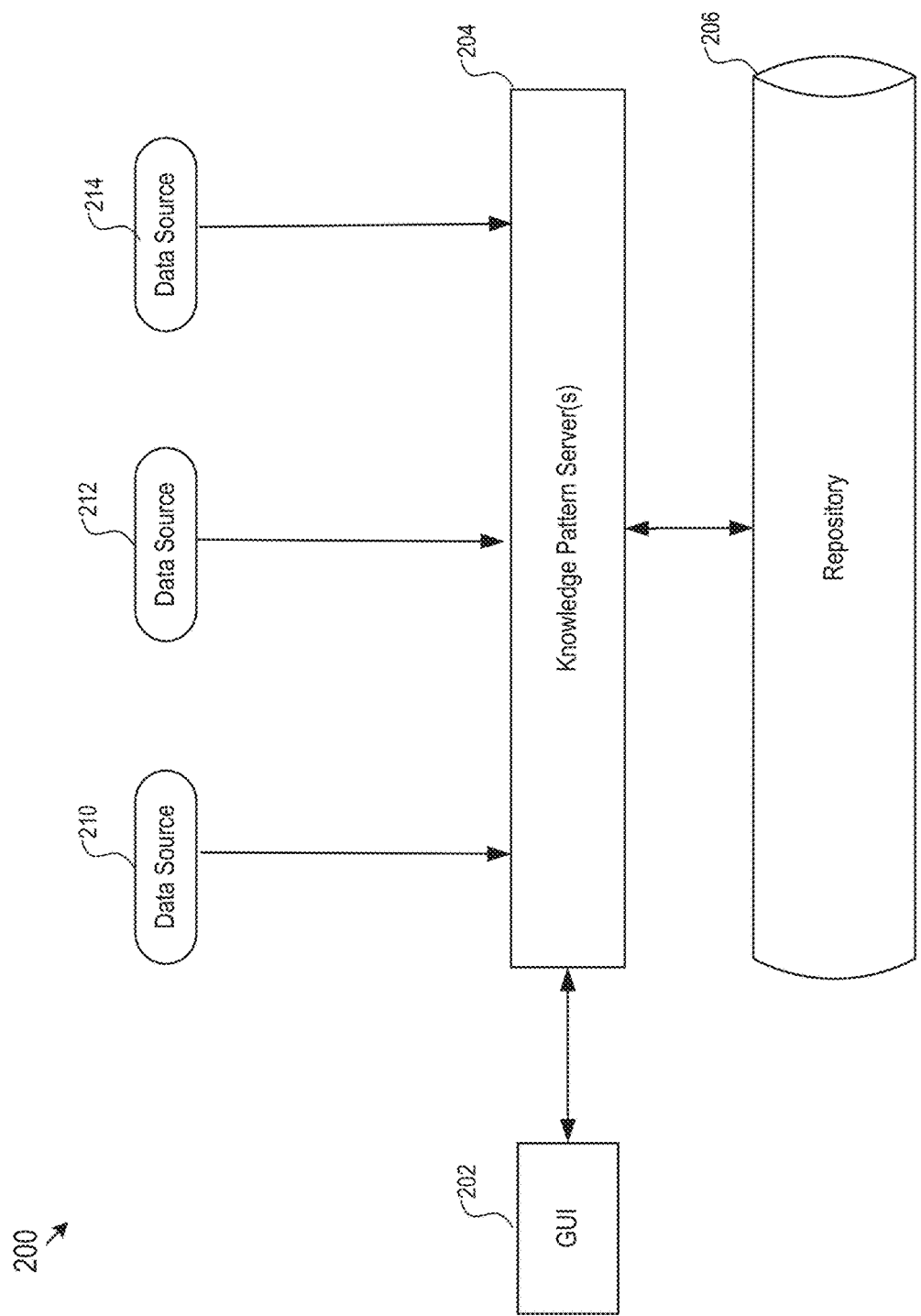
FIG. 2 illustrates an example block diagram of a real-time intelligent predictive knowledge pattern recognition machine.

FIG. 2 further illustrates example connectivity 200 between various subsystems of the knowledge pattern machine system of FIG. 1. Specifically, the knowledge pattern servers 106/108 may include a set servers 204 in communication with repository 206, which, as described in more detail below, hold various knowledge items (variables), knowledge patterns, input queries (or user queries), and reports. The knowledge pattern servers 204 may further communicate with each of the user computing devices 112-118 of FIG. 1 via a Graphical User Interface (GUI) 202 for receiving user queries and interactive commands, and for sending various knowledge patterns, input query options, and final report. The knowledge pattern servers 204 may further communicate with data sources 210, 212, and 214 for performing data mining and pattern detection of disparate data items from the data sources. The data mining, for example, may be implemented as normal keyword based queries. The knowledge pattern servers 204 may maintain one or more up-to-date indexes of information items in the data sources 210-214 to speed up the data mining process by the knowledge pattern servers 204.

Figure 3:
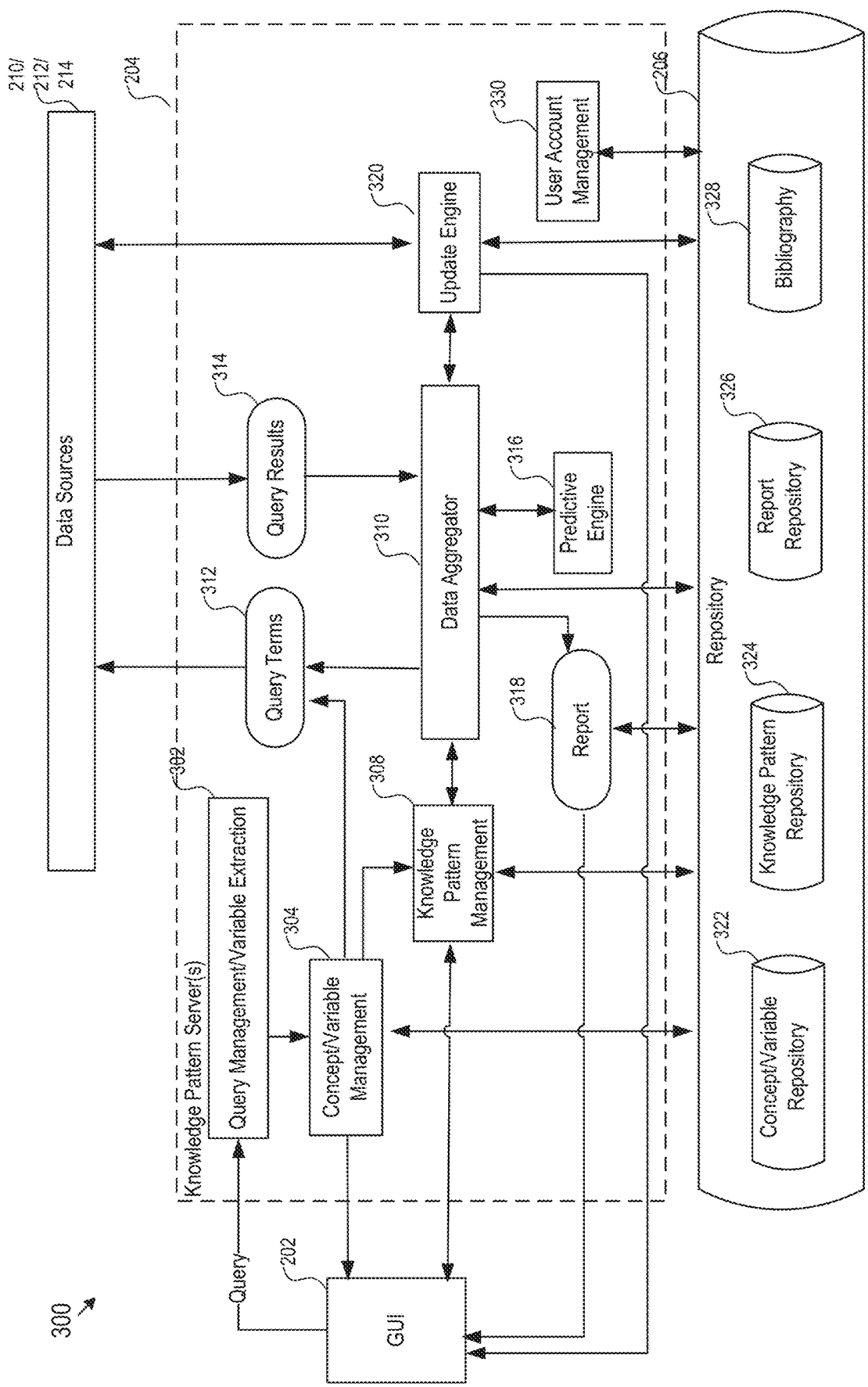
FIG. 3 illustrates various functional components of an example real-time intelligent predictive knowledge pattern recognition machine.

FIG. 3 illustrates example functional blocks of the knowledge pattern servers 204 and the repository 206 of FIG. 2 in further detail. FIG. 3 is described below in reference to FIGS. 4-6, in which various example user interfaces on the GUI 202 are shown for various operation stages of the knowledge pattern machine.

As shown in FIG. 3, the knowledge pattern servers 204 may include a query management/variable extraction engine 302. The query management/variable extraction engine 302 may receive queries from the user via the GUI 202 and perform intelligent analytics of the queries. The user queries may be alternatively referred to as user inquiries. The user queries may be input by the user in free form text, as shown by the example user query input interface as shown in 402 of FIG. 4, in which an input text box 406 may be provided for user input and a button 408 may be provided for receiving a user command to proceed with the query. As such, the query management/variable extraction engine 302 of FIG. 3 may include, for example, natural language processing components for intelligently extracting information from an input query. In some implementations, the query management/variable extraction engine 302 may convert the input query into a multi-dimensional vector in an embedding space or any type of multi-dimensional vector space using one or more models trained using various machine learning techniques. Such models may be trained using a pre-labeled training dataset. Distances between multi-dimensional vectors in the embedding space may be used to quantify similarity among the multi-dimensional vectors.

The query management/variable extraction engine 302 may further be pre-trained to divide the embedding space into compartments. Each of the compartments may correspond to a cluster of concepts (alternatively referred to as knowledge items, or variables). The query management/variable extraction engine 302 thus may be capable of determining a concept embedded in an input query by mapping the input query to a point within a particular cluster compartment in the embedding space. Points within a cluster may represent conceptually like knowledge items.

Alternatively, the input query may be parsed into multiple segments and each segment may be mapped to its own cluster in the embedding space. As such, multiple concepts may be extracted from an input query. In some other implementations, the query management/variable extraction engine 302 may be trained to convert an input query to multiple concepts by directly mapping the query to multiple points in different clusters in the embedding space with mapping probabilities. As such, the multiple concepts extracted from the input query by the query management/variable extraction engine 302 may be ranked and prioritized.

The concepts or variables generated by the query management/variable extraction engine 302 may be further processed by a concept/variable management engine 304. The concept/variable management engine 304 may be responsible for identifying correlation between the concepts/variables and further responsible for organizing the various concepts/variables into a relational, graphical, or other structures. For example, the concept/variable management engine 304 may organize the various concepts/variables into a knowledge graph comprising nodes and edges, where the nodes represent the various concepts/variables and the edges represent the relationship therebetween. Such a knowledge graph may be stored in the repository 206 as a concept/variable repository 322.

The organized concepts/variables may be expanded as new queries are analyzed. The relationship between the various concepts and variables may be identified using machine learning techniques. Such relationship may be learned further based on external data sources. As such, the relationship between the concepts/variables may be updated as the external data evolve over time. For example, the relationship (and thus the concept/variable repository 322) may be update periodically, or on any scheduled time.

In some implementations, the concept/variable management engine 304 may process the extracted concepts/variables from the query management/variable extraction engine 302 for a particular user input query, according to the concept/variable organizational structures, into an organized and prioritized concepts/variable list relevant to the user query, and send the list to the GUI 202 of the user computer device for display as a first response to the user query. An example list of relevant concepts and variables that may be displayed in the GUI is illustrated in 420 of FIG. 4. The list 420 may be shown along with the user input interface 402 of FIG. 4, e.g., as the user input is being entered or after the user activate the command 408. Alternatively, the list 420 may be shown in a separate user interface subsequent to the user query input interface 402 and after the command 408 is activated by the user.

Figure 4:
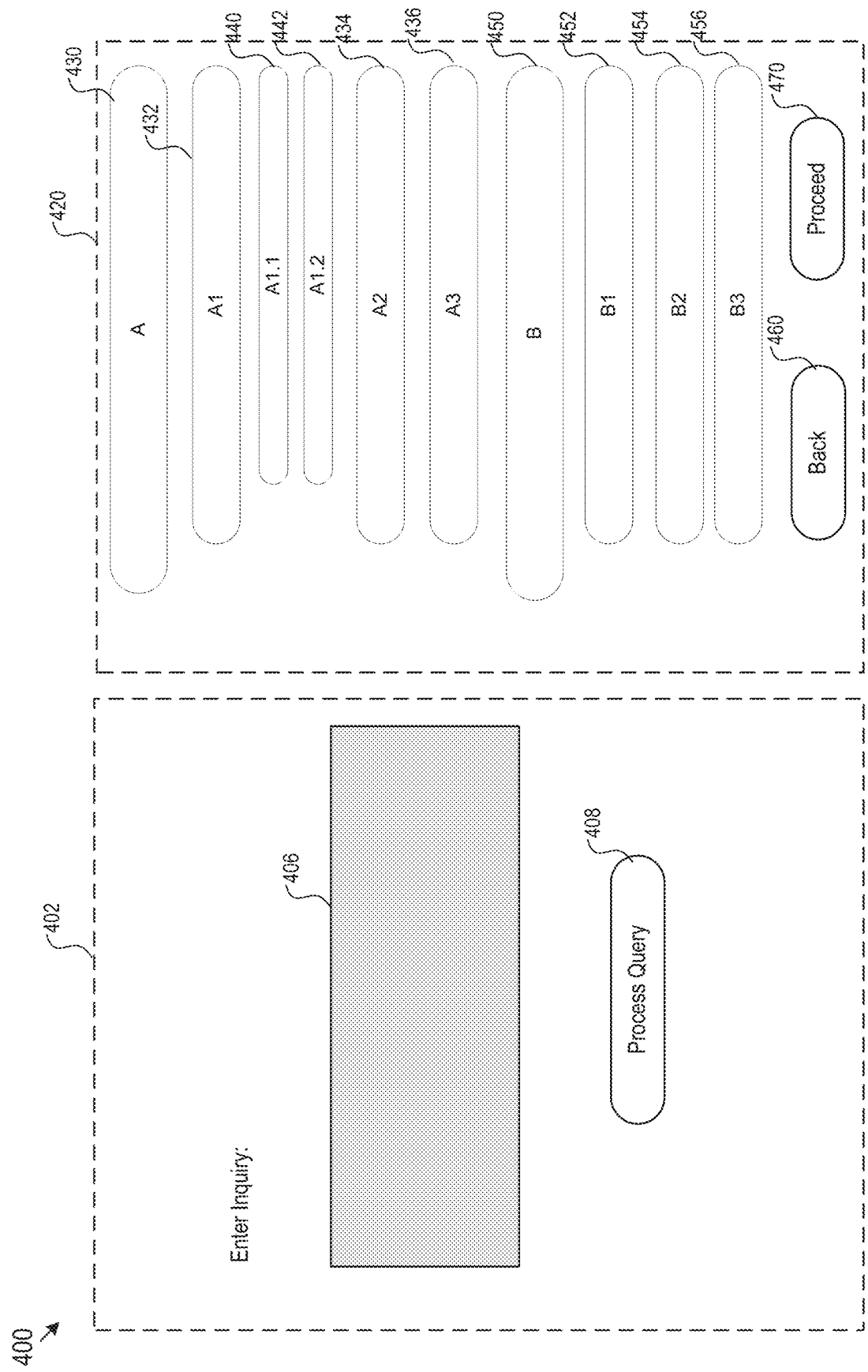
FIG. 4 shows an example user query interface of a real-time intelligent predictive knowledge pattern recognition machine.

The list, as shown in 420 of FIG. 4 as an example, may include a hierarchically organized concepts and variables. Such hierarchical relationship between the listed concepts/variables may be graphically indicated, as shown in 420 of FIG. 4. The list may be shown in order of relevance. For example, the concepts/variables shown on the top of the list 420 may be more relevant to the user query than the concepts/variables shown on the bottom of the list as determined by the concept/variable management engine 304. The hierarchical concept/variable list may include top level concepts/variables such as 430 (A), and 450 (B), second level concept/variables such as 432 (A1), 434 (A2), 436 (A3), 452 (B1), 454 (B2), 456 (B3), and third level concept/variables such as 440 (A1.1), 442 (A1.2).

In some implementations, the hierarchical concept/variable list 420 may only include variables direct extracted from a particular query and may be generated according to the concept/variable organizational structure. Alternatively, the hierarchical concept/variable list 420 with respect to the particular query may be expanded to add other relevant concepts/variables based on recorded and/or machine-learned current trends according to the external data used to train the concept/variable management engine 304.

Optionally, the various concepts and variables in the hierarchical concept/variable list 420 as shown in the GUI 202 may be individually selectable by the user. Specifically, the user may select or highlight the concepts and variables that are of particular of interest to the user for further knowledge pattern analysis. Once the concepts and variables that are of interest to the user are selected via the GUI 202, the user may proceed to activate the "proceed" button 470 for further knowledge pattern processing. Otherwise, the user may choose to navigate back to the query input interface 402 for modifying the query or starting over.

Returning to FIG. 3, the entire concept/variable list 420 of FIG. 4 or the set of concepts/variables as selected by the user may be communicated from the concept/variable management engine 304 to a knowledge pattern management engine 308. The knowledge pattern management engine 308 may intelligently analyze and identify correlations among these concepts and variables and recognize/generate one or more knowledge patterns. In some implementations, the knowledge patterns my further include one or more new concepts or variables identified by the knowledge pattern management engine 308 as suitable for providing various aspects that facilitate the user in ascertaining answers to the query.

Figure 5:
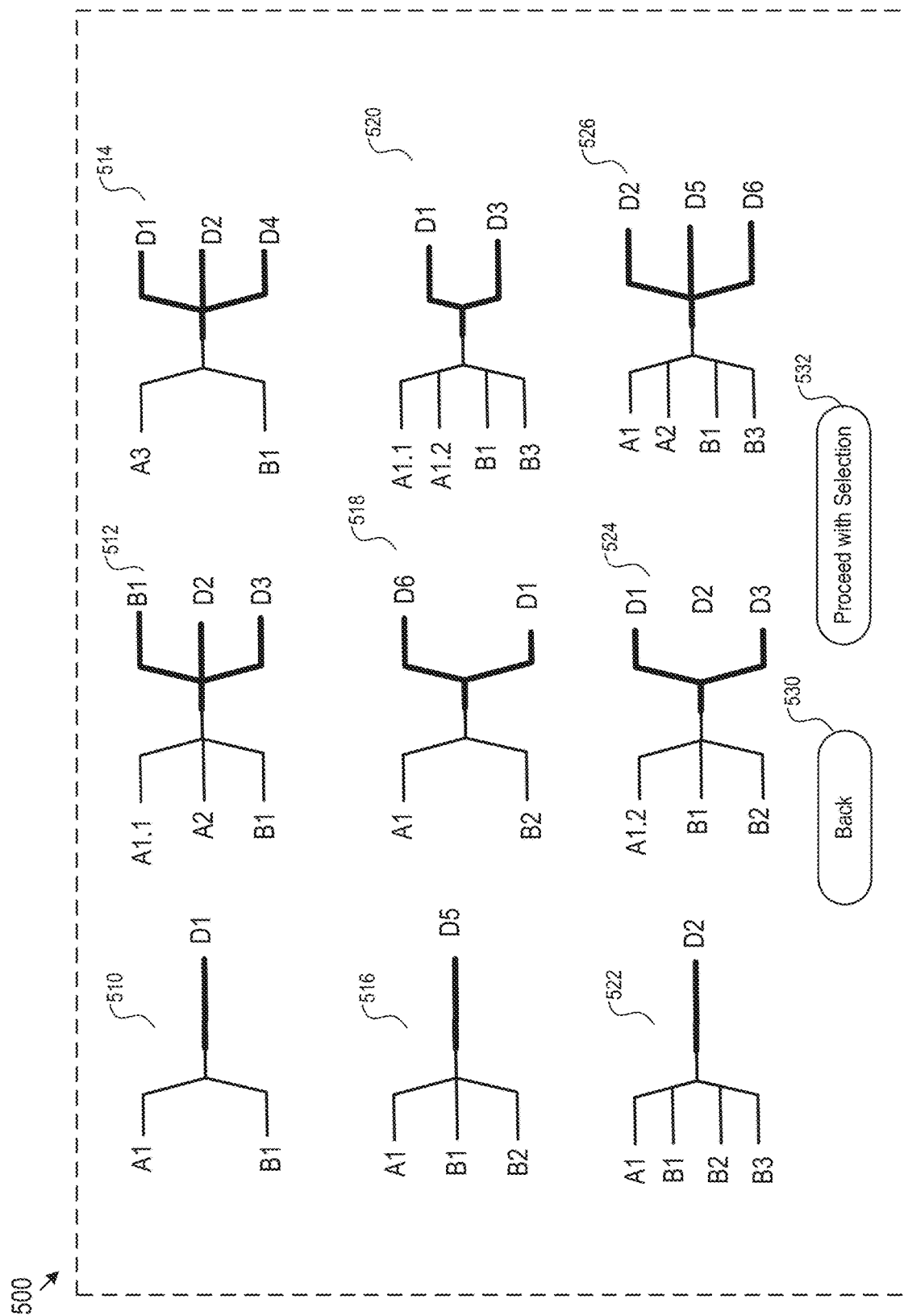
FIG. 5 shows an example user knowledge pattern selection interface of a real-time intelligent predictive knowledge pattern recognition machine.

FIG. 5 illustrates example knowledge patterns 500 generated by the knowledge pattern management engine 308. In the non-limiting example of FIG. 5, each individual knowledge pattern are shown visually as a double-sided tree structure. The tree structure on the left side of each of the knowledge patterns represents the concepts/variables associated with the input query that are considered as correlated by the knowledge pattern management engine 308. The tree structure on the right side of each of the knowledge pattern represents new concepts/variables that are related to the input variable considered by the knowledge pattern management engine 308 as likely subject matters contributing to answers to the user inquiry. The visualization in 500 of FIG. 5 may be further representative of what the knowledge pattern management engine 308 feeds back to the GUI 202 of FIG. 3 for viewing by the user. In other words, from the user standpoint, the GUI transitions from the interface 420 of FIGS. 4 to 500 of FIG. 5 after the user activates the "Proceed" command 470 of FIG. 4. These knowledge patterns generated by the knowledge pattern management engine 308 may be ranked, e.g., with the most relevant patterns (as identified by the knowledge pattern management engine 308 of FIG. 3) listed at the front.

The knowledge patterns 510-526 shown in FIG. 5 illustrate various example combination of concepts/variables associated with the input query that are correlated as identified by the knowledge pattern management engine 308 of FIG. 3. Such correlations may be expanded to one or more other concepts or variables. For example, as shown in 510, the knowledge pattern management engine 308 identifies that two of the second level concepts/variables A1 and B1 of 420 of FIG. 4 are correlated via concept/variable D1 not included within the concepts/variables of 420 of FIG. 4 (which are identified by the concept/variable management engine 304 as associated with the input query). Likewise, the knowledge pattern management engine 308 may further identify that different set of two concepts/variables of 420 of FIG. 4 may be correlated via two other variables (as shown by 518), and via three other variables (as shown in 514). Similarly, the knowledge pattern management engine 308 may further identify that different set of three concepts/variables of 420 of FIG. 4 may be correlated via a single other variable (as shown in 516), via two other variables (as shown by 524), and via three other variables (as shown in 512); and that different set of four concepts/variables of 420 of FIG. 4 may be correlated via a single other variable (as shown in 522), via two other variables (as shown by 520), and via three other variables (as shown in 526). The concepts/variables represented by "D" in FIG. 5 may be different from those associated with the input query (the "A" and "B"). Those having ordinary skill in the art understand that the concepts/variables associated with the input query may nevertheless appear on the right side of the knowledge patterns in FIG. 5. For example, the knowledge pattern 512 of FIG. 5 shows that the concept A1.1, A2 and B1 are correlated via concept/variable B1, D2 and D3, where B1 is among the list 420 of FIG. 4. The various knowledge patterns shown in FIG. 5 are merely examples. Any other correlations among the various concepts and variables may be identified by the knowledge pattern management engine 308. Such correlations and knowledge patterns may be graphically illustrated in other forms unlimited to the particular example shown in FIG. 5. Further, the knowledge patterns identified by the knowledge pattern management engine 308 may be further stored in the repository 206 of FIG. 3 as a knowledge pattern repository 324.

The knowledge patterns generated by the knowledge pattern management engine 308 as shown in FIG. 5 provide a collection detected or recognized correlation of topics or concepts/variables. As shown in FIG. 5, the user may be allowed to select the particular one or more knowledge patterns that fit her or his actual interest. The selected knowledge patterns are then used for further performing aggregation and predictive data analytics of disparate data items form the data sources, as described in more detail below. The user selection, representing her/his interest, may be further recorded in the repository 206 of FIG. 3.

The identification of the knowledge patterns as shown in FIG. 5 by the knowledge pattern management engine 308 may be based on various pre-trained machine-learning models. In addition or alternatively, the knowledge pattern management engine 308 may derive the knowledge patterns for a query further based on prior knowledge patterns stored in the knowledge pattern repository 324 of FIG. 3. In some implementations, the knowledge pattern management engine 308 may derive the knowledge patterns for a query further based on prior user selected knowledge patterns as recorded in the repository 206 of FIG. 3.

For example, the knowledge pattern management engine 308 may compare a new query and the concepts/variables thereof with historical queries and derive the knowledge patterns for the new query based on a similarity and or difference according to the comparison. The knowledge pattern management engine 308 may further organize the historical queries and knowledge patterns according to their differences and similarities. For example, one query or knowledge pattern may be an expanded version of another query or knowledge pattern. As such, the queries and the knowledge patterns may be hierarchically organized. The organized knowledge patterns in the repository 206 may then be relied on by the knowledge pattern management engine 208 to generate a set of knowledge patterns for a new input query for user selection. In addition, the organized knowledge patterns in the repository 206 may also be used to assist the concept/variable management engine 304 in developing the variable/concept list 420 of FIG. 4 for a particular input query.

The recognition and generation of the knowledge pattern by the knowledge pattern management engine 308 may be further base on correlation among data received from the data sources 210, 212, and 214 (the data mining process are further described in more detail below). For example, the knowledge pattern management engine 308 may intelligently identify correlations between the data items or query results returned from the data sources using, e.g., machine learning techniques. The knowledge patterns are recognized from such correlations and graphically shown as the various example patterns in FIG. 5. The correlations may be ordered according to their strength. Correlations higher than a predetermined threshold may be included and reflected in the graphical patterns of FIG. 5.

Returning to FIG. 3, the concept/variable management engine 304 may generate query terms 312 and send the query terms to the data sources 210-214 to generate query results 314, which may be provided to a data aggregator 310. As described above, in some implementations, the data aggregator 310 and the knowledge pattern management engine 308 may recognize correlations in the query results and generate the knowledge patterns of FIG. 5. In some other implementation, the knowledge patterns may be generated in other manners by the knowledge pattern management engine 308 (as described above) and the user selected knowledge patterns and/or the concepts/variables may be used for generating the query terms 312. The query terms may be sent to the data sources 210-214 to obtain query results 314. The data mining of the data sources 210-214 using the query terms 312 may be based on any types of data mining technologies. A correspondence between the query terms and the concepts/variables of the user selected knowledge patterns may be tracked by the data aggregator 310. As such, correspondence between the data returned by the from the data sources 210-214 and the concepts/variables in the knowledge pattern may be identified.

The query results 314 may then be processed by the data aggregator 310 according to the knowledge patterns to generate report 318. Optionally, the data aggregator 310 may also retrieve previously generated reports stored in the report repository 326 for its data analytics. The report generated by the data aggregator may be predictive in nature. In other words, the report 318 may contain information that does not directly exist in the data sources 210-214 and thus could not be part of the query results 314. Specifically, the data aggregator may rely on an internal or external predictive engine 316 to generate predictions based on the query results 314 and according to the user selected knowledge patterns. The predictive engine 316 may include various prediction modules including but not limited to various regression algorithms, various types of neural networks, and the like. The prediction may be qualitative or quantitative. For example, the prediction may be directed to some general trends. For another example, the predictions may include numerical values for a particular variable of the user selected knowledge patterns.

Figure 6:
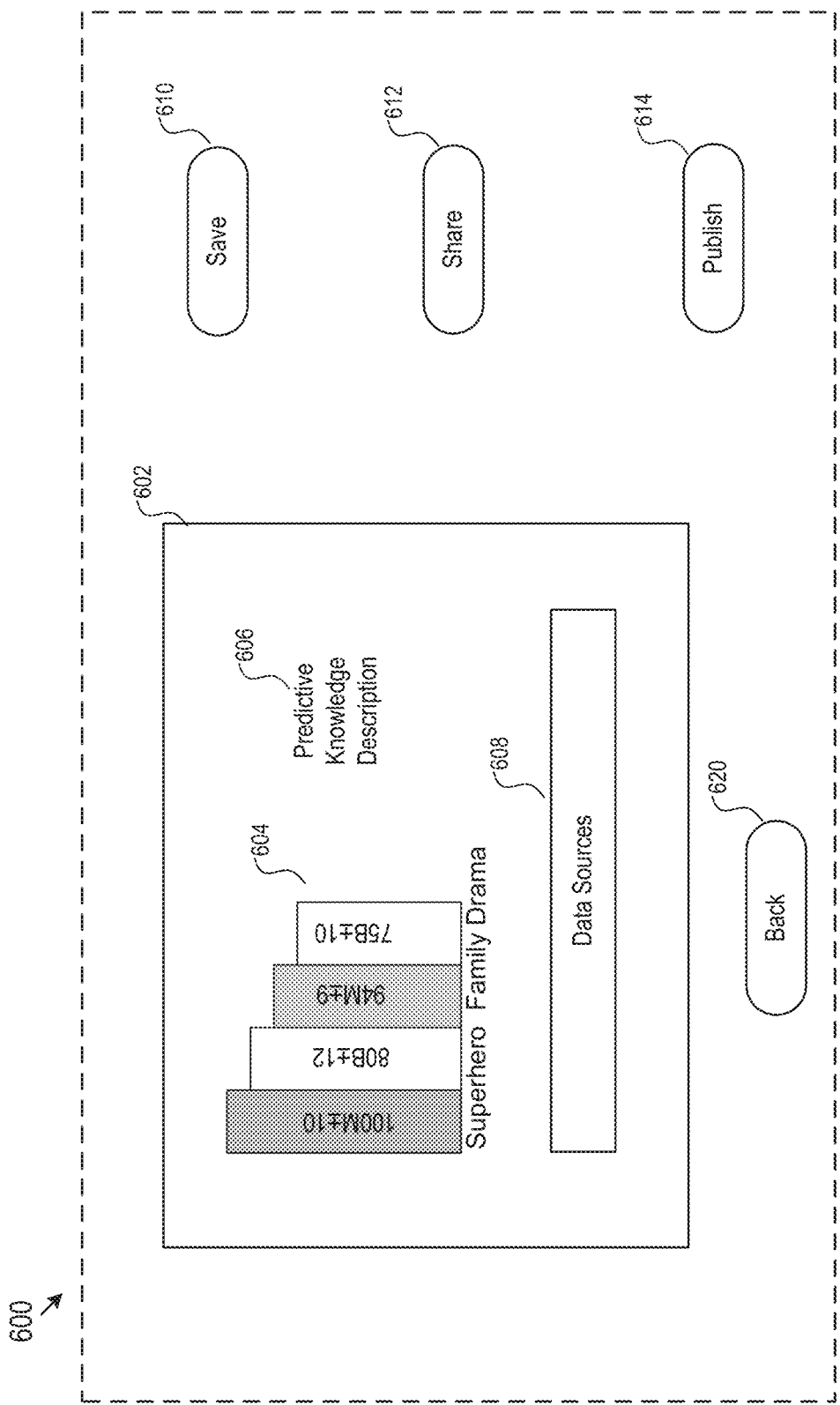
FIG. 6 shows an example report interface of a real-time intelligent prediction according to a knowledge pattern.

The report 318 automatically generated by the data aggregator 310 may be stored in the repository 206 as the report repository 326. The report 318 is further provided by the knowledge pattern servers 204 to the user GUI 202. The report may be displayed graphically in the GUI 202 for user viewing, as shown in the example of FIG. 6. FIG. 6 shows that the report may be visually displayed as panel 602 of a GUI interface 600. As an example, the panel 602 may include various descriptions 606 and graphics 604. In some implementations, the graphics 604 may include various two dimensional or three dimensional line graphs, bar graphs, scatter plots, pie charts, mosaic/Mekko charts, Gannt charts, waterfall charts, spider charts, contour plots, heat maps, and the like. While a single graph is illustrated in FIG. 6, the number of graphics is not so limited and is determined by the number knowledge patterns and numerical correlation between the concepts and variables in the knowledge patterns. These graphics may indicate numerical relationship between the various concepts/variables in the user selected knowledge patterns. Some of the data in these graphics may comprise predictive and/or futuristic values. These predictive/futuristic values may provide critical information for answering the user query.

The visual format of the report in the panel 602 may be chosen by the user. As such, an additional user interface in the GUI 202 may be provided for format selection. Various options may be provided to the user for selection based on the nature of the query, whether the analytics is numerical, and the number of variables involved in the report. The options may include choice between graphical and textual representations, type of graphics, layout of the presentation, and the like. The options of visual format presented by pattern machine for the user to choose may be intelligently determined by the pattern machine according to the types, nature, and number of the concepts/variables. The user may be allowed to choose more than one options. The visual representation of the report may then be generated by the data aggregator 310 accordingly.

Because some of the data values in the graphics 604 are predictive, error estimation for these data values may also be shown in the graphics 604. Such error estimation may be generated by the data aggregator 310 and the predictive engine 316 of FIG. 3 when performing the predictive data analytics. For example, the errors may be numerically estimated when a regression algorithms is used to make a prediction. For another example, a neural network for predicting values for a particular variable may be associated with a prediction probability. Such prediction probability may be used for estimating the prediction error. The prediction error, for example, may be shown as error bars in the graphics 604 of FIG. 6. Alternatively, a separate error estimation graph for all predictions may be shown in the panel 602.

The displayed information panel 602 may also indicate data sources used by the data aggregator 310 for performing data analytics and for generating the graphics 604 or description 606, as shown by 608 in FIG. 6. The data sources may be listed in 608 as a bibliography. If a data source is viewable or downloadable by the user, a link (via a web browser, for example) may be included in the data source list 608. The information related to the data sources may be further stored in the repository 206 of FIG. 3 as the bibliography repository 328. In some alternative implementations, bibliography of data sources used for a particular prediction may be shown, accessed, and viewed in separate user interfaces.

The GUI interface 600 of FIG. 6 may further include other GUI navigation controls such as the "Back" button 620. The user may activate the button 620 to return a previous GUI interface, such as the knowledge pattern display and selection interface 500 of FIG. 5. Other navigation controls may also be included for the user to directly navigate to any other GUI interfaces described above. The GUI interface 600 may further include command button 610 that may be activated by the user for saving the reports and data sources to the report repository 326 and bibliography repository 328 of FIG. 3.

Returning to FIG. 3, the knowledge pattern servers may also implement an update engine 320 for updating the reports for the user queries and knowledge patterns recorded in the repository 206. The updated reports may be further stored in the repository 206. In some implementations, the update engine 320 may monitor changes in data sources associated with the various reports in the repository 206. The changes may then trigger the update engine 320 to regenerate these reports by invoking the data aggregator 310 and the predictive engine 316 to rerun the predictive data analytics. In some other implementations, the update engine 320 may invoke the data aggregator 310 and the predictive engine 316 to generate updated reports periodically or according to a predetermined schedule and store the updated reports in the repository 206. As such, the report associated with the various knowledge patterns as stored in the repository 206 may be kept up-to-date in real-time, periodically, or at any predefined times. The user may be notified of any updates of any particular knowledge pattern via the GUI 202 and determine whether to view an updated report generated for previous queries.

The knowledge pattern servers 204 of FIG. 3 are described above with respect to a particular user of the knowledge pattern machine. In some implementations, the knowledge pattern servers 204 and the GUI 202 may be configured to provide the functions above to a plurality of users as a knowledge pattern service. As such, the knowledge pattern servers 204 my further include a user account management engine 330 of FIG. 3. The user account management engine 330 maintains and secures separate accounts for each user subscribed to the knowledge pattern service. The concepts/variables, the knowledge patterns, the reports, and the data source bibliographies may correspondingly be managed and maintained according to user accounts. In other words, each user may be associated with his/her own service space of queries, variables, concepts, knowledge patterns, and reports, as a predictive personal knowledge base that expands over time as more queries are processed for the user by the knowledge pattern servers 204.

In some other implementations, knowledge patterns and/or reports maintained for a particular user may be shared to one or more other users or a group of users, and may be published for use by all other users. As such, the user account management engine of 330 may be configured to link the user account spaces for sharing or publishing of user-specific knowledge patterns. Shared knowledge patterns do not need to be duplicated in the repository 206. Instead, shared knowledge pattern stored in the repository 206 may be associated with access permissions given to one or more user accounts.

Accordingly, as shown in the report interface 600 of FIG. 6, a particular user may decide to share or publish a particular data pattern and report by activating a "Share" command button 612 or "Publish" command button 614. As a result of such sharing or publishing action, the particular knowledge pattern and report may become part of other user's collection of knowledge patterns and reports, which may then become part of the basis for the knowledge pattern management engine 308 and data aggregator 310 for processing future queries from those users.

In some implementations, the knowledge pattern servers 204 may further provide one or more user interfaces via the GUI 202 for user to navigate and view previously queries, knowledge patterns, and reports. As described above, these queries, knowledge patterns, and reports may be hierarchically organized and displayed in the GUI 202 to facilitate user navigation and selection.

Figure 7:
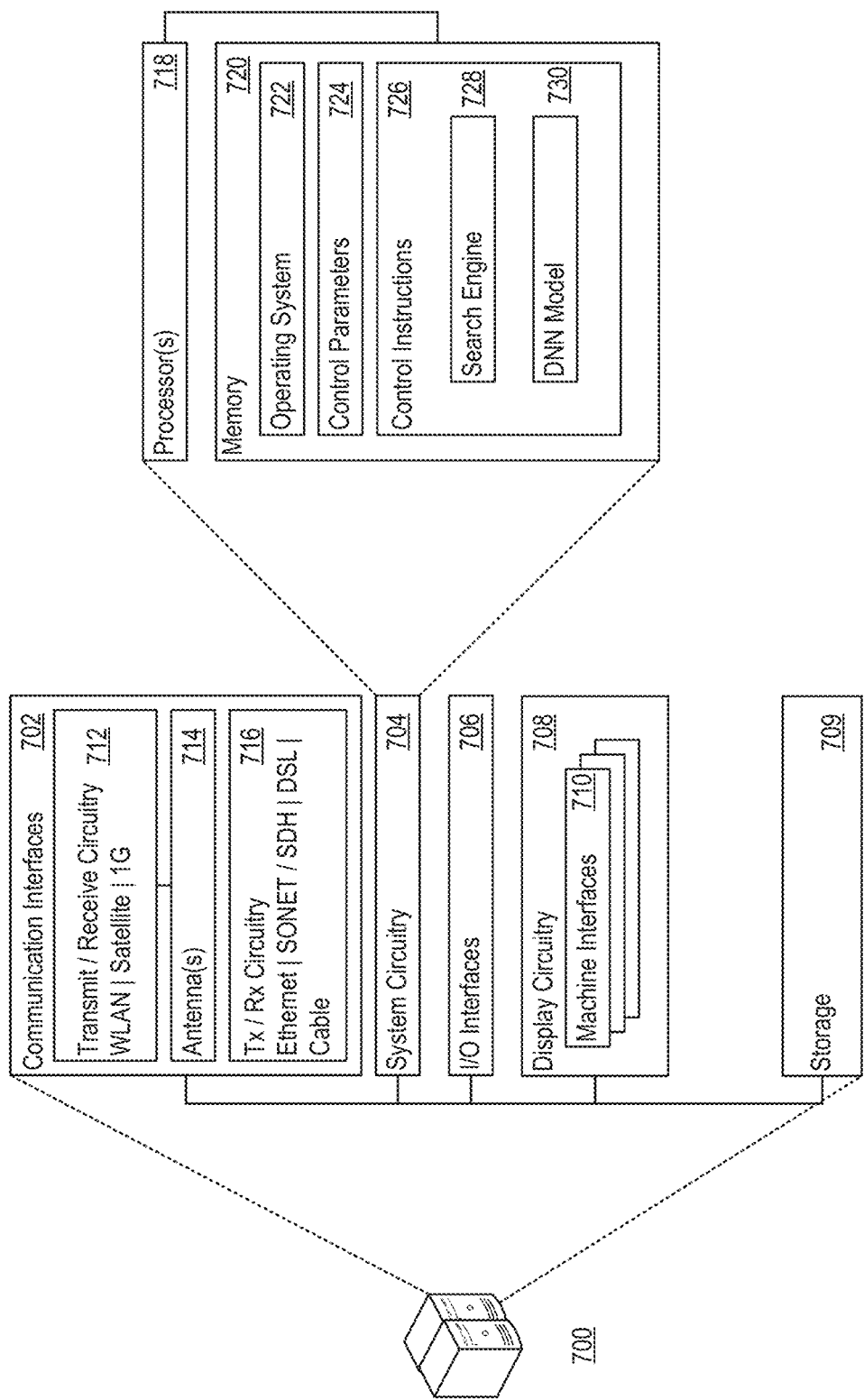
FIG. 7 shows an example computer device that may be implemented in various components of the real-time intelligent predictive knowledge pattern recognition machine of FIGS. 2-3.

Finally, in FIG. 7, the knowledge pattern servers and databases 106 and 108 and data sources 102 and 104 of FIG. 1 are shown as including a group of centralized or distributed dedicated or virtual computers. Each of these computers as well as the user computing devices 112-118 of FIG. 1 may be implemented as shown in 700 of FIG. 7, including communication interfaces 702, system circuitry 704, input/output (I/O) interfaces 706, storage 709, and display circuitry 708 that generates machine interfaces 710 (such as the user interfaces described above) locally or for remote display, e.g., in a web browser running on a local or remote machine. The machine interfaces 710 and the I/O interfaces 706 may include GUIs, touch sensitive displays, voice or facial recognition inputs, buttons, switches, speakers and other user interface elements. Additional examples of the I/O interfaces 706 include microphones, video and still image cameras, headset and microphone input/output jacks, Universal Serial Bus (USB) connectors, memory card slots, and other types of inputs. The I/O interfaces 706 may further include magnetic or optical media interfaces (e.g., a CDROM or DVD drive), serial and parallel bus interfaces, and keyboard and mouse interfaces.

The communication interfaces 702 may include wireless transmitters and receivers ("transceivers") 712 and any antennas 714 used by the transmitting and receiving circuitry of the transceivers 712. The transceivers 712 and antennas 714 may support Wi-Fi network communications, for instance, under any version of IEEE 802.11, e.g., 802.11n or 802.11ac. The communication interfaces 702 may also include wireline transceivers 716. The wireline transceivers 716 may provide physical layer interfaces for any of a wide range of communication protocols, such as any type of Ethernet, data over cable service interface specification (DOCSIS), digital subscriber line (DSL), Synchronous Optical Network (SONET), or other protocol. The computers 700 may communicate with on another via the communication interface 702 shown in FIG. 7 and the communication network 101 as shown in FIG. 1.

The storage 709 may be used to store various initial, intermediate, or final data or model for implementing the functionalities of the knowledge pattern machine and the various other computing components described above. The storage 709 may be centralized or distributed. For example, the storage 279 may be hosted remotely by a cloud computing service provider.

The system circuitry 704 may include hardware, software, firmware, or other circuitry in any combination. The system circuitry 704 may be implemented, for example, with one or more systems on a chip (SoC), application specific integrated circuits (ASIC), microprocessors, discrete analog and digital circuits, and other circuitry. The system circuitry 704 is part of the implementation of any desired functionality related to the knowledge pattern machine. As just one example, the system circuitry 704 may include one or more instruction processors 718 and memories 720. The memories 720 may store, for example, control instructions 724 and an operating system 722. In one implementation, the instruction processors 718 may execute the control instructions 724 and the operating system 722 to carry out any desired functionality related to the functionalities of the knowledge pattern machine described above.

An examples application of the intelligent knowledge pattern recognition machine above is further given below. In this example application scenario, a screenwriter may have several ideas spanning different genres for her next screenplay writing project. But she does not know which idea to commit to writing. She would like to efficiently and effectively spend her time writing a screenplay that will give her the best chance of success in the upcoming year. In using the pattern machine for her predictive analytics in place of doing manual research, she may input into the pattern machine a query or question which reads, for example, "what screenplays will be most successful next year?" The pattern machine, by using the intelligent concept/variable management engine 304 of FIG. 3, may process the input query and intelligently breaks down this input query and generate the following categories and topics as output concepts/variables relating to screen play and their success:

A. Movie Screenplay
  (a) Genre
  (b) Tone
  (c) Type of Protagonist
  (d) Length
B. TV Show Script
  (a) Genre
  (b) Tone
  (c) Type of Protagonist
  (d) Length
C. Immediate Success
  (a) Independent Interest
  (b) Studio Interest
  (c) Talent Agent Interest
D. Long-Term Success
  (a) Box Office
  (b) Awards
  (c) Social Media
  (d) Critical Reviews
  (e) Festivals
  (f) America
  (g) International In other words, the pattern machine identifies relevant main categories from the original input inquiry and identifies relevant subtopics by, for example, analyzing relevant data related to the main categories. The main categories or subtopics could vary, depending upon the phrasing of the original input query and the consequently relevant data which pertains to the entertainment industry at the moment the screenwriter inputs her question. The pattern machine may rank these main categories and subtopics and may only supply the most relevant items or a predefined number of items. The hierarchical layers for the main categories and subtopics are not limited to the two levels illustrated in the example above. These main categories and subtopics may form the basis for the concept/variable lists of FIG. 4. The screen writer may review the list and determine whether she needs to tweak or rephrase her question. She may also supply additional questions for further narrowing the scope of the main categories and subtopics.

The screen writer may select and refine from the main categories and subtopics. For example, she may be only interested in writing a movie screen play rather than a TV show. Further, she may already have a talent agent but is interested in, for example, seeing what type of financial backers might be interested in investing in her screenplay, either independent filmmakers or studios. She may be also only interested in, for example, the American rather than the International industry. As such, she may select all categories except for "TV Show Script" and all subtopics except for "Talent Agent Interest" and "International" in the user interface 420 of FIG. 4, and activate the "Proceed" command.

Thereafter the pattern machine intelligently generates pattern diagrams illustrating correlations between the main categories and subtopics based on intelligently recognized correlations in the available relevant data associated with these main categories and subtopics. The pattern diagrams may be presented as shown via the example user interface 500 of FIG. 5. For example, the pattern machine may determine that "Tone" and "Type of Protagonist" subtopics directly relate to "Studio Interest" and "Independent Interest", but not correlated with "Long-Term Success". The pattern machine may further determine that "Genre" does directly correlate with "Long-Term Success". As such, the pattern machine extract the main categories and subtopics that are correlated as determined by relevant data, and present the correlations between them as the various pattern diagrams shown in FIG. 5.

The screenwriter may then selects one or more of the diagrams for further predictive data analytics. For example, she may select via the user interface 500 of FIG. 5 a pattern diagram representing "Long-Term Success" by "Movie Genre" and a pattern diagram representing correlation between "Awards" and "Screenplay Length." She may then proceed to with the predictive data analytics by activating button 532 of FIG. 5.

The Pattern machine may then perform data analytics using current data from various data sources to generate predictive correlation between these categories or subtopics. For visual presentation, the pattern machine may provide the screen writer interface for selection from a plurality of most relevant graphical formats. For example, a bar graph of "Long-Term Success by Movie Genre" might most effectively demonstrate that Superhero Movies are predicted to be the most successful in Box Office and Social Media in America in 2021. The screen writer may choose this format. In the bar graph, as illustrated as 604 in FIG. 6, for example, social media may be shown as grey bars representing "Number of Mentions Across All Platforms" and Box Office may be shown as white bars represented by "Amount in US Dollars." Genres would comprise the other axis, with each genre specific (for example, Dark Comedy, Family Drama, Superhero, Sitcom, etc.) associated with a Social Media bar and a Box Office Bar. Margin of error for the predictions may also be indicated. For example, the pattern machine may predict that the Superhero genre could have a lead over the Family Drama genre by 5 Billion USD in Box Office and 6 Million in Social Media Mentions in 2021 in America with predicted margins of error. Textual information as shown in 606 of FIG. 6 may also be generated by the pattern machine. In this example, the textual information as a response to the inquiry of the screen writer may be "Superhero Movies will be the most successful movie genre in America in 2021 with the predicted margin of error."

For the "Award" and "Screenplay Length" correlation identified by the pattern machine, the screen writer may choose a linear chart as a visual format for presenting the prediction by the pattern machine. As such, a linear chart may be generated and may show that the screenplays which are predicted to win the most awards in America in 2021 will be around 70 pages long, with a predicted margin of error. For example, one axis of the linear graph may represent screenplay length as "Page Number", and the other axis may represent "Number of Awards" for the screenplays. A text representation may be further generated by the pattern machine. The text representation may be: "The most award-winning screenplays in America in 2021 will be around 70 pages long, with a 7% margin of error."

The screenwriter may saves her Pattern Machine report including the two example visual graphs above, each with descriptive legends, margins of error, and citation of data sources used in the predictive analytics. These stored predictive reports may be automatically updated as described above. With such automatic real-time updates, she may be able to access her "Screenplay Success" patterns later on to obtain up-to-date predictive report. By 2021, the patterns will remain predictive, and will have adjusted according to real-time data analysis. The screenwriter may further share her pattern report with others via the pattern machine, as described above. For example, she may share the pattern with her co-workers when writing a superhero screenplay.

Later, when the screenwriter revises her screenplay, she might return to the pattern machine for further predictive analysis. For example, she may want to submit her screenplay to a specific screenwriting contest. She could either edit the previously saved pattern report by returning to the original query and adding another entry to specify the specific "Award" she is trying to win. In this manner, she could measure her chances at winning the specific contest alongside the other factors of success (box office, social media, critical reviews, etc.) relying on the predictive analytics of the patter machine. Alternatively, she may generate a new report as described above.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A system for generating a predictive pattern recognition knowledge base, comprising:
   a database;
   a circuitry configured to:
   receive an input query from a user; and
   perform processing steps of:
   automatically extracting a set of knowledge items from the input query based on a query processing model by:
   applying a semantic model to the input query to generate the set of knowledge items;
   automatically categorizing the set of knowledge items; and
   storing the categorized set of knowledge items to the database;
   selecting a subset of hierarchically organized knowledge items from the database and the set of knowledge items extracted from the input query;
   presenting the subset of hierarchically organized knowledge items for user selection via a graphical user interface;
   storing the user selection in the database;
   automatically generating a set of knowledge patterns each in a form of a visual or textual representation of correlation between at least two of the set of knowledge items;
   performing predictive data analytics of data associated with the input query aggregated from disparate data sources using one or more machine-learning algorithms to generate textual or numerical prediction for at least one of knowledge items within one or more of the set of knowledge patterns;

generating a predictive graphical or textual report based on the predictive data analytics for presentation to the user; and storing at least one of the input query, the set of knowledge items, the set of knowledge patterns, the textual or numerical prediction, or predictive graphical or textual report in the database; and automatically update any one of the processing steps in response to automatically detected changes in data associated with any one of the processing steps.

2. The system of claim 1, wherein the circuitry is configured to automatically generate the set of knowledge patterns in the form of a visual or textual representation of correlation between user-selected knowledge items.

3. The system of claim 1, wherein the circuitry is configured to automatically categorize the set of knowledge items according to a trained AI model.

4. The system of claim 1, wherein the circuitry is configured to further update the predictive graphical or textual report in the database when another input query is received from the user or any other user of the system.

5. The system of claim 1, wherein the circuitry is configured to further update the predictive graphical or textual report in the database when changes in the data associated with the input query aggregated from disparate data sources are detected.

6. The system of claim 1, wherein the circuitry is configured to further update the predictive graphical or textual report in the database periodically.

7. The system of claim 1, wherein the circuitry is further configured to automatically notify the user of after updating any one of the processing steps.

8. The system of claim 1, wherein the circuitry is further configured to provide a graphical user interface containing a plurality of format options for user selection of a format for the predictive graphical or textual report prior to generating the predictive graphical or textual report.

9. The system of claim 8, wherein the circuitry is configured to automatically determine the plurality of format options based on the input query.

10. The system of claim 1, wherein the predictive graphical or textual report comprises at least one data item that is predicted based on the data associated with the input query rather than pre-existing.

11. The system of claim 1, wherein the circuitry is further configured to organize a plurality of knowledge patterns of the user in a hierarchical manner.

12. A method comprising:
receiving an input query from a user; and
performing processing steps of:
automatically extracting a set of knowledge items from the input query based on a query processing mode by:
applying a semantic model to the input query to generate the set of knowledge items;
automatically categorizing the set of knowledge items; and
storing the categorized set of knowledge items to a database;
selecting a subset of hierarchically organized knowledge items from the database and the set of knowledge items extracted from the input query;
presenting the subset of hierarchically organized knowledge items for user selection via a graphical user interface;
storing the user selection in the database;
automatically generating a set of knowledge patterns each in a form of a visual or textual representation of correlation between at least two of the set of knowledge items;
automatically generating a set of knowledge patterns each in a form of a visual or textual representation of correlation between at least two of the set of knowledge items;
performing predictive data analytics of data associated with the input query aggregated from disparate data sources using one or more machine-learning algorithms to generate textual or numerical prediction for at least one of knowledge items within one or more of the set of knowledge patterns;
generating a predictive graphical or textual report based on the predictive data analytics for presentation to the user; and
storing at least one of the input query, the set of knowledge items, the set of knowledge patterns, the textual or numerical prediction, or predictive graphical or textual report in the database; and
automatically updating any one of the processing steps in response to automatically detected changes in data associated with any one of the processing steps.

13. The method of claim 12, comprising automatically generating the set of knowledge patterns in the form of a visual or textual representation of correlation between user-selected knowledge items.

14. The method of claim 12, comprising automatically categorizing the set of knowledge items according to a trained AI model.

15. The method of claim 12, further comprising updating the predictive graphical or textual report in the database when another input query is received from the user or any other user.

16. The method of claim 12, further comprising updating the predictive graphical or textual report in the database when changes in the data associated with the input query aggregated from disparate data sources are detected.

* * * * *

UNITED STATES PATENT AND TRADEMARK OFFICE
CERTIFICATE OF CORRECTION

| | | |
|---|---|---|
| PATENT NO. | : 11,687,797 B2 | |
| APPLICATION NO. | : 17/159707 | |
| DATED | : June 27, 2023 | |
| INVENTOR(S) | : Isabella Tappin | |

It is certified that error appears in the above-identified patent and that said Letters Patent is hereby corrected as shown below:

In the Claims

In Column 15, Claim 3, Line 23, delete "Al" and replace with --AI--

Signed and Sealed this
Twenty-seventh Day of February, 2024

Katherine Kelly Vidal
*Director of the United States Patent and Trademark Office*